(12) United States Patent
Beschi

(10) Patent No.: US 11,317,758 B2
(45) Date of Patent: May 3, 2022

(54) COFFEE MACHINE

(71) Applicant: MODBAR LLC, Fort Wayne, IN (US)

(72) Inventor: Alessandro Beschi, Bussolengo (IT)

(73) Assignee: MODBAR LLC, Fort Wayne, IN (US)

( * ) Notice: Subject to any disclaimer, the term of this patent is extended or adjusted under 35 U.S.C. 154(b) by 0 days.

(21) Appl. No.: 14/778,294

(22) PCT Filed: Mar. 3, 2014

(86) PCT No.: PCT/IB2014/059395
§ 371 (c)(1),
(2) Date: Sep. 18, 2015

(87) PCT Pub. No.: WO2014/147501
PCT Pub. Date: Sep. 25, 2014

(65) Prior Publication Data
US 2016/0278572 A1    Sep. 29, 2016

(30) Foreign Application Priority Data

Mar. 21, 2013  (IT) .......................... BS2013A000037

(51) Int. Cl.
*A47J 31/54*  (2006.01)
(52) U.S. Cl.
CPC .................................. *A47J 31/54* (2013.01)
(58) Field of Classification Search
CPC .................................................. A47J 2201/00
USPC ........................................................ 99/300
See application file for complete search history.

(56) References Cited

U.S. PATENT DOCUMENTS

| | | | | |
|---|---|---|---|---|
| 1,473,898 A | * | 11/1923 | Bossini | ................. A47J 31/469 99/294 |
| 2,341,319 A | * | 2/1944 | Graham | ................. F28D 7/026 165/156 |
| 3,087,415 A | * | 4/1963 | Kaplan | ................. A47J 31/007 99/281 |
| 3,795,788 A | | 3/1974 | Perucca | |
| 4,757,752 A | | 7/1988 | Robins et al. | |
| 4,790,239 A | | 12/1988 | Hewitt | |
| 4,947,738 A | | 8/1990 | Eugster | |
| 5,259,297 A | * | 11/1993 | Giuliano | ............... A47J 31/007 99/282 |
| 5,357,848 A | | 10/1994 | Eugster et al. | |

(Continued)

FOREIGN PATENT DOCUMENTS

| | | | |
|---|---|---|---|
| AU | 2005101006 A4 | 2/2006 | |
| CA | 2843759 A1 * | 3/2012 | .......... A47J 31/4485 |

(Continued)

*Primary Examiner* — Ibrahime A Abraham
*Assistant Examiner* — Spencer H. Kirkwood
(74) *Attorney, Agent, or Firm* — Nixon & Vanderhye P.C.

(57) ABSTRACT

A coffee machine (100), particularly suitable to be used in catering establishments or the like, is described, comprising a machine body (10) provided with a delivering assembly (30) for delivering coffee, at least one boiler (20) designed to heat the water up to the working temperature and means (25) for drawing water from the boiler (20) and supplying the same to the delivering assembly (30). The boiler (20) is arranged outside of the machine body (10) and remotely therefrom such that the overall dimensions on the working surface are considerably reduced and a simple replacement or interchangeability of the various components is allowed.

20 Claims, 5 Drawing Sheets

(56) References Cited

U.S. PATENT DOCUMENTS

| | | | |
|---|---|---|---|
| 5,372,061 A | 12/1994 | Albert et al. | |
| 5,551,331 A | 9/1996 | Pfeifer et al. | |
| 5,644,972 A * | 7/1997 | Dahmen | A47J 31/007 426/433 |
| 5,778,765 A | 7/1998 | Klawuhn et al. | |
| 5,816,135 A * | 10/1998 | Ferri | A47J 31/06 99/290 |
| 6,561,079 B1 | 5/2003 | Muller et al. | |
| 7,203,419 B2 * | 4/2007 | Malone | F16L 53/38 392/468 |
| 7,814,824 B2 * | 10/2010 | Beretta | A47J 31/56 99/282 |
| 8,656,826 B2 | 2/2014 | Bianchi et al. | |
| 8,880,427 B1 | 11/2014 | Jones | |
| 2005/0034606 A1 * | 2/2005 | In Albon | A47J 31/521 99/284 |
| 2009/0126577 A1 | 5/2009 | Ternite | |
| 2010/0175560 A1 | 7/2010 | Blanc et al. | |
| 2011/0097454 A1 | 4/2011 | Coccia | |
| 2011/0283889 A1 * | 11/2011 | Con | A47J 31/42 99/286 |
| 2014/0069279 A1 | 3/2014 | Upston et al. | |
| 2014/0305313 A1 | 10/2014 | Waldron et al. | |
| 2015/0004288 A1 * | 1/2015 | McHale | A47J 31/465 426/231 |
| 2016/0278572 A1 | 9/2016 | Beschi | |

FOREIGN PATENT DOCUMENTS

| | | | |
|---|---|---|---|
| DE | 2747990 A1 | 1/1979 | |
| GB | 650370 A * | 2/1951 | A47J 31/44 |
| WO | 2011/135479 A1 | 11/2011 | |

* cited by examiner

COFFEE MACHINE

FIELD OF THE INVENTION

The present invention relates to a coffee machine preferably, but not exclusively, used in catering establishments such as bars, hotels, restaurants or the like, that is a coffee machine for the HORECA sector.

STATE OF THE ART

As known, a conventional coffee machine primarily is made up of a machine body inside which at least one delivering assembly for delivering coffee is incorporated, wherein a ground coffee portion, or a coffee pod, is brewed, a boiler to heat the water up to a working temperature, for example 85° C., and a water distribution pump supplying the water drawn from the boiler to the delivering assembly, for example at a pressure of about 8-9 bars.

More particularly, in professional coffee machines used in establishments such as bars, restaurants or the like, the machine body is substantially in a single block having an elongated box-shape. The machine body substantially comprises a perforated supporting base, generally supporting the demitasses and under which a liquid collection tray is provided, and a housing portion extending sideways and above the supporting base, in which all the machine components are lodged.

In particular, the boiler and the pump together with one or more coffee delivering assemblies spaced one from another—typically each comprising a portafilter handle for supporting a tablet of ground coffee or a prepackaged pod of ground coffee—are integrated in the housing portion, hidden from the user view. The delivering assemblies are arranged such as to protrude above the supporting base, so that the delivered coffee falls in the demitasses by gravity.

Further components are also integrated in the housing portion such as, for example, manometers for controlling the delivering pressure and the boiler pressure; pressure switches for controlling the pressure and the ignition of heat sources to maintain constant the water temperature in the boiler, and level detectors verifying the water level in the boiler.

Therefore, in conventional coffee machines, the machine body is bulky and generally of remarkable size, especially considering that it should be placed on the working counter.

The boiler is substantially a tank provided with usually electric heating means. Dimensions and volume of the tank are directly proportional to the number of delivering assemblies the machine is provided with. Therefore, the greater the number of delivering assemblies, the greater the volume and dimensions of the boiler and of the whole coffee machine.

As a result, coffee machines provided with multiple delivering assemblies are bulky and appear unpleasant.

In addition to the aforesaid drawbacks related to dimensions, traditional structure of coffee machines also involves operational drawbacks mainly connected to the operations of maintenance, repair or replacement of the integrated components.

For example, maintenance operations provide a scheduled cleaning and a constant control, especially for the components of the boiler and the supplying pump, as well as for the gaskets undergoing a high working pressure, the water flow ducts subjected to residues and dirt deposits, etc.

However, even for a skilled operator, the above mentioned operations of maintenance, repair or replacement of pieces are quite arduous and complicated to carry out, and necessarily lead to a total and prolonged down time; this aspect affects the productivity.

In addition, usually the components of the machine, even if the latter is bulky, almost completely fill the inside thereof and operators must perform the operations of maintenance in confined spaces, with obvious difficulty.

Further, in some cases it is difficult to work directly on-site, for example for replacing a component, and it is necessary to collect the entire machine to bring it to a special centre to be repaired.

Moreover, the modularity of conventional professional coffee machines, that are designed as a single-block integrating all the operating devices, turns out to be lacking, i.e. they cannot be complemented later by adding components such as additional delivering assemblies or boilers for heating water.

SUMMARY OF THE INVENTION

It is an object of the present invention to provide a coffee machine, particularly a professional machine used in the HORECA sector, for example in catering establishments or the like, which is reduced in dimensions, more practical and functional with respect to conventional solutions, its efficiency being equal.

It is another object of the present invention to provide a coffee machine of the above mentioned type, which is structurally simple and cost effective and allows to simply and quickly carry out operations of maintenance and/or replacement of components.

These and other objects are obtained by a coffee machine according to claim 1.

In particular, the coffee machine comprises a machine body provided with at least one delivering assembly. The expression "machine body" refers to the casing, to the portion or the block arranged on a working surface, for example a bar counter, for supporting at least one delivering assembly above the demitasses to be filled.

The coffee machine also comprises at least a boiler designed to heat the water up to a working temperature and means for drawing water from the boiler and supplying it as coming in the delivering assembly.

In particular, the delivering assembly comprises a delivering outlet of the water flow, which is delivered by drawing and supplying means, provided with a quick-coupling for removably coupling with a portafilter handle. A typical portafilter handle comprises, in turn, a filtering element wherein a tablet of ground coffee or a prepackaged pod of ground coffee is arranged.

In particular, the coffee machine according to the present invention provides at least the boiler arranged outside of the machine body and remotely therefrom, such that the structure of the coffee machine can be simplified and the dimensions and weight of the machine body arranged on the working surface can be considerably reduced.

In a preferred embodiment, also the means for drawing and supplying water are arranged outside and remotely with respect to the machine body.

Preferably, the drawing and supplying means comprise at least one hydraulic connection extending from the boiler towards the delivering assembly and at least one pressurizing device, preferably an electropump, picking up water from the boiler and pressurizing it up to a working pressure to generate a flow supplied as coming in the at least one delivering assembly for coffee infusion. For example, the boiler heats the water up to 85° C.-95° C. and the pump increases the pressure of the drawn water flow up to about 8 bar-9 bars.

Preferably, the boiler operation is feedback regulated in response to signals generated by sensors placed in the corresponding delivering assembly or in response to the controls the user gives by means of a control unit comprising, for example, regulators of the temperature, pressure, etc. To implement this feature, the coffee machine comprises an electric wiring for connecting the boiler and the electropump with the respective delivering assembly and/or with the control unit. In the following a specific example is described.

Preferably, the boiler and the pressurizing device are arranged and integrated in a single supplying unit arranged outside and remotely with respect to the machine body, preferably under the working surface, or counter.

In other words, in this arrangement, the two main operating devices of the coffee machine, i.e. the delivering assembly and the supplying unit, are disengaged and independent of each other, allowing a considerable reduction of the overall dimension on the working surface, and defining a simplified structure of the machine itself which can facilitate the operations of maintenance and replacement of components.

In a preferred embodiment, the supplying unit is designed to be removably housed in a corresponding housing chamber, prearranged under a working surface, or counter, on which the machine body is placed. This characteristic is particularly advantageous in terms of ease of maintenance. In case of malfunction, or if cleaning of the boiler is required, the technician simply removes the supplying unit from the respective housing chamber, thus being able to work in more comfortable spaces or to easily replace the supplying unit with another new, already cleaned or serviced unit.

Moreover, in case the supplying unit suffers from a serious malfunction, such as to endanger the proper operation of the coffee machine, the user of the coffee machine—for example a bar manager—can store a spare supplying unit for a quick replacement. In other words, the supplying unit being interchangeable, even an unskilled user can replace the boiler, without calling out a skilled technician, evidently saving time and money.

More preferably, the housing chamber comprises a bottom wall on which quick-coupling taps are prearranged allowing the fluidic connection of respective plugs of the supplying unit with the hydraulic connections supplying the delivering assembly, or the delivery assemblies, if there is more than one.

In a preferred embodiment, the machine body is designed as a column placed on the working surface. The column, in its turn, supports the corresponding delivering assembly at a height raised with respect to the working surface, allowing the demitasses to be prearranged under it.

Preferably an auxiliary heating device, for example electric, integrated in the machine body is provided which allows to maintain or return the water flow coming in the coffee delivering assembly to the working temperature. By providing the further heating device, it is possible to maintain substantially constant the water temperature, even when the machine is not working, i.e. it is paused. This arrangement therefore allows to prevent water from cooling down in the path between the boiler and the delivering assembly.

Instead, the supplying unit is still connected to the respective delivering assembly through the hydraulic connection which is, in a preferred embodiment, a duct passing through the respective support column and through the working surface.

Preferably, the hydraulic duct is thermally insulated so that the temperature of the water flow flowing therein is maintained substantially constant over time and along the duct itself and the thermal losses are minimized.

In a preferred embodiment, each hydraulic duct is maintained at a constant temperature by electric heating means or by the aid of a coaxial tube wherein the water flows at a higher temperature with respect to the water flow passing through the hydraulic duct connected to the delivering assembly; the coaxial tube substantially acts as a heat exchanger.

In one embodiment, the coffee machine comprises a plurality of delivering assemblies.

Preferably, a single supplying unit is provided that simultaneously serves all the coffee delivering assemblies. Alternatively, each coffee delivering assembly is coupled with a respective supplying unit.

Preferably, as previously described, the supplying unit is removably inserted within the housing chamber. For example, the supplying unit and the housing chamber comprise respective slide guides allowing a "drawer-like" insertion and extraction thereof. The "drawer-like" coupling allows to selectively switch from a first arrangement, wherein the supplying unit is integrated in the housing chamber and connected to the taps for the connection with the delivering assembly, to a second arrangement, wherein the supplying unit is disconnected from the taps and can be completely or partially pulled out from the housing chamber to allow operations of maintenance and/or complete replacement.

Thus, the supplying unit is totally and easily interchangeable and, therefore, if necessary, the normal user can replace it with a spare one, for example during operations of maintenance or in case of malfunction, without causing a prolonged down time of the coffee machine.

In particular, a coupling to connect the boiler with water mains by a hydraulic supplying duct is also prearranged on the bottom wall of the housing chamber.

In a preferred embodiment, the supplying unit further comprises a control unit prearranged on a front face of the supplying unit, visible by the user.

In particular the control unit allows to monitor and regulate, for example, the boiler and electropump operation, respectively for regulating and monitoring the working temperature and pressure. Further, the control unit allows to control more components integrated in the supplying unit, such as water flow control valves or thermocouples to detect the working temperature of the water flow etc. or else a water filtering or softening assembly.

Further, the Applicant reserves to file a divisional application relating to a machine as previously described, designed to make drinks other than coffee, such as tea, infusions or the like.

DETAILED DESCRIPTION OF THE FIGURES OF THE INVENTION

More features and advantages of the invention will be better understood by considering the following specification of several, but not exclusive, preferred embodiments, illustrated by way of example only and without limitation, with the support of the accompanying drawings, in which.

DETAILED DESCRIPTION OF THE INVENTION

Figure 1:
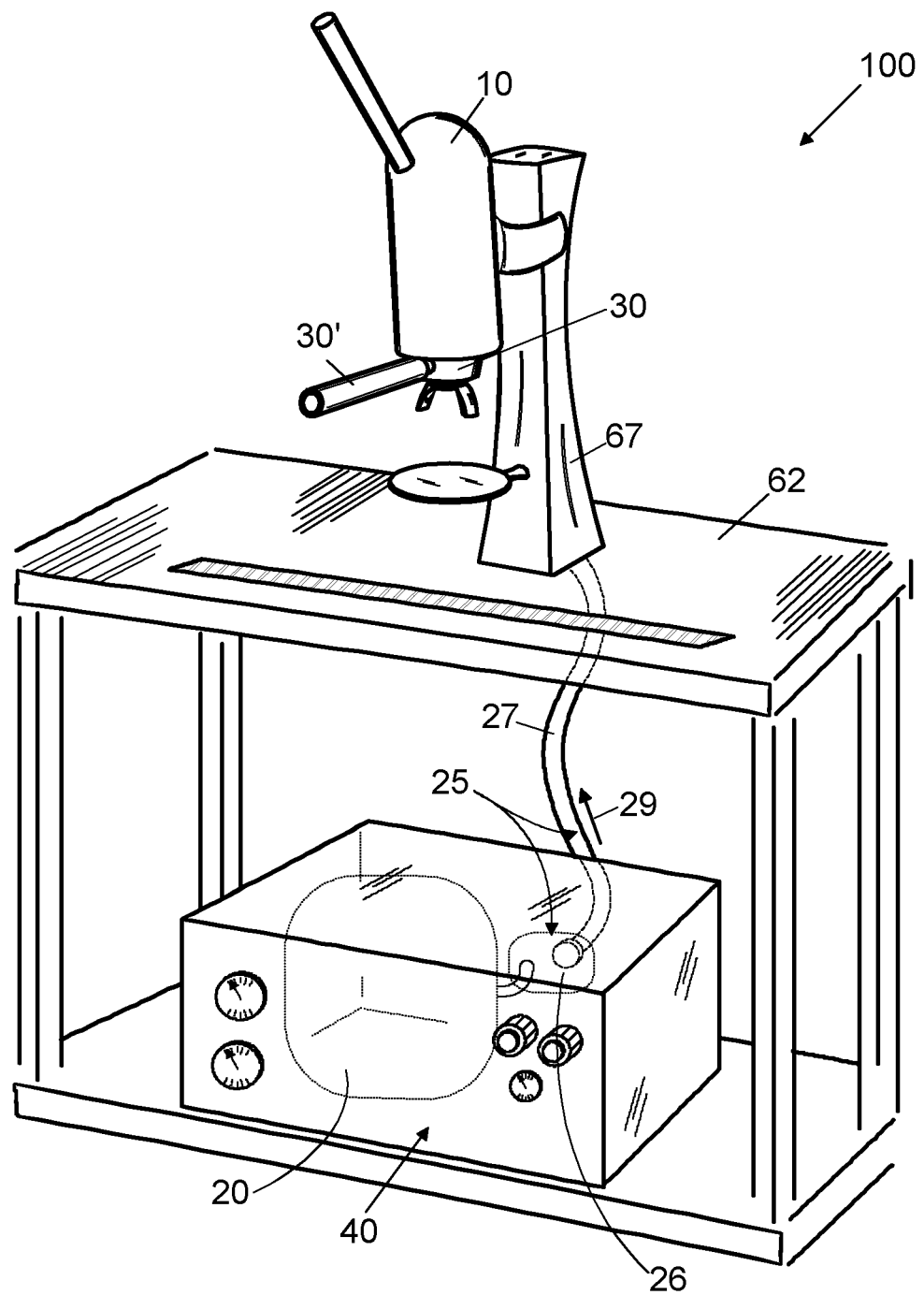
FIG. 1 shows a schematic perspective view of a coffee machine according to the present invention.

Referring to FIG. 1, a coffee machine 100 according to the present invention, preferably suitable for professional use in catering establishments such as, for example bars, hotels, restaurants or the like, is schematically shown.

In particular, the coffee machine 100 comprises a machine body 10 prearranged with at least one coffee delivering assembly 30. The machine body 10 is substantially a block adapted to be prearranged on a working surface 62, close at hand of a user looking after the usual assembly/disassembly operations of the delivering assembly 30, necessary for making coffee.

The coffee machine 100 further comprises a boiler 20 designed to heat the water up to a working temperature and drawing and supplying means 25 of water allowing to pick up water from the boiler 20 and generate a water flow 29 coming in the delivering assembly 30.

In particular, the delivering assembly 30 comprises a delivering outlet (not shown in detail) of the water flow 29. The delivering outlet is provided with a quick coupling for removably coupling with a portafilter handle 30'. The latter comprises in its turn a filtering element wherein a tablet of loose coffee ground or a prepackaged coffee pod is prearranged. The water flow 29 leaked out of the delivering outlet hits the coffee ground pressed in the filter or held in the pod and allows to extract the coffee by brewing.

In the structural solution of the present invention, the boiler 20 is outside of the machine body 10 and in a remote position with respect to the latter and to the working surface 62. In a preferred embodiment, both the boiler 20 and the drawing and supplying means 25 are arranged outside of the machine body 10 and remotely therefrom. This arrangement of the coffee machine 100 allows to considerably reduce the bulk dimensions the machine body 10 takes on the working surface 62 and, meanwhile, to overcome the drawbacks due to maintenance of the same, the separation of the boiler 20 from the machine body 10 allowing to facilitate the cleaning operations of components, thus preventing prolonged down times.

In particular, as still schematically shown in FIG. 1, the drawing and supplying means 25 comprise at least one pressurizing device 26, preferably an electropump, allowing to pressurize the water coming out of the boiler 20 and to generate, together with the latter, a water flow 29 at a predetermined temperature and working pressure. The water flow 29 is conveyed to the delivering assembly 30 through a hydraulic connection 27 extending from the boiler 20 via the electropump 26. In addition to the hydraulic connection 27, electric connections are provided to operatively control the boiler 20 and the corresponding delivering assembly 30.

Advantageously, each hydraulic connection 27 is thermally insulated to reduce thermal losses and substantially maintain constant the water temperature 29 of the flow directed to the delivering assembly 30. In a preferred embodiment, each hydraulic duct 27 is provided with heating elements, for example electric resistances, able to provide auxiliary heat to maintain constant the temperature of the water flow 29. As an alternative to the electric resistances, a piping coaxial to the hydraulic duct 27 itself, in which a fluid at a higher temperature flows thereby allowing the exchange of latent heat with the water flow 29, is provided.

In particular, as described below, advantageously the operation of the boiler 20 and the electropump 26 is feedback regulated by acting on associated sensors or electric components. To implement this feature it is therefore necessary to prearrange an electric wiring to connect the boiler 20, the electropump 26, and the respective delivering assembly and/or a control unit 45; a specific example is described below.

The boiler 20 and the electropump 26 are preferably arranged and integrated in a single supplying unit 40. The supplying unit 40 defines, per se, the operational block or assembly of the coffee machine 100 and is arranged outside of the machine body 10 and remotely therefrom with respect to the working surface 62.

Figure 2:
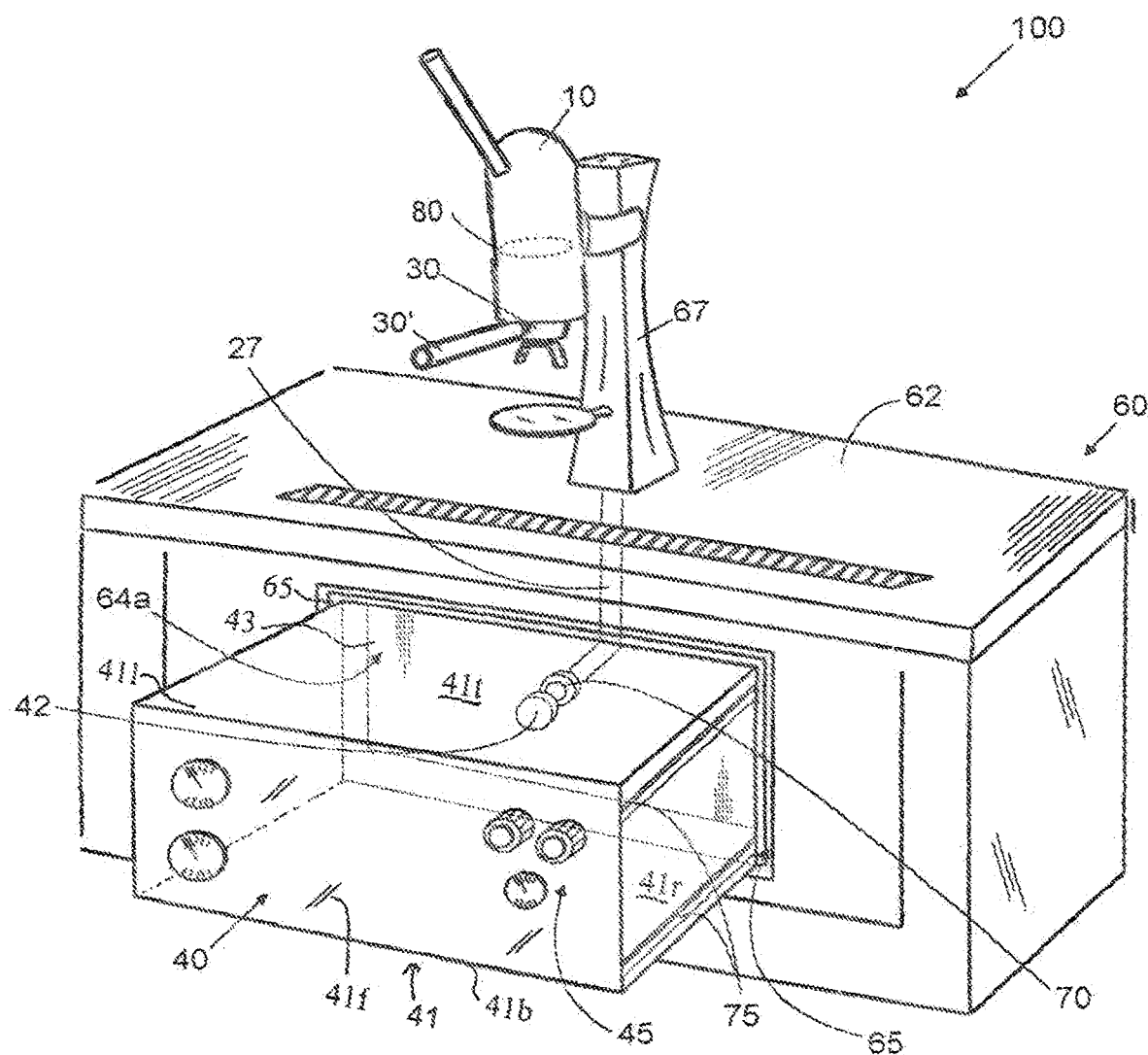
FIG. 2 shows a perspective view of the coffee machine in a first preferred embodiment.

As better shown in FIG. 2, the supplying unit 40 is inserted under a supporting structure or counter 60 comprising a housing chamber 64 obtained under the working surface 62. The supplying unit 40 can be prearranged substantially horizontally or vertically to fit the dimensional specifications of the counter itself.

In particular, as shown, in FIG. 2, FIG. 2A, FIG. 3, and FIG. 4, the housing chamber 64 comprises a housing chamber cavity 65 which is at least partially defined by housing chamber wall 64a. The supplying unit 40 comprises supplying unit housing 41 which is dimensioned to fit the dimensional specifications of housing chamber cavity 65 and to provide drawer-like insertion and extraction into housing chamber cavity 65. The supplying unit housing 41 comprises supplying unit housing front face 41f, supplying unit housing bottom face 41b, supplying unit housing left face 41l, supplying unit housing right face 41f, supplying unit housing top face 41f, and supplying unit housing rear face 43. The boiler 20 and pressuring device 26 are contained within the supplying unit housing 41. The supplying unit housing rear face 43 comprises plugs 42. The housing chamber wall 64a is prearranged with quick-coupling taps 70, respectively allowing to connect with plugs 42 of the rear face 43 of supplying unit 40 and with the hydraulic connection 27 supplying the delivering assembly 30. The coupling taps 70 can be plugged into the plugs 42 of the supplying unit 40 and allow to provide a tight fluidic connection even in case of high working pressures. Advantageously, in a not shown way, couplings to connect the boiler 20 with water mains by a hydraulic supplying duct are also prearranged on the bottom wall 64a.

Figure 2A:
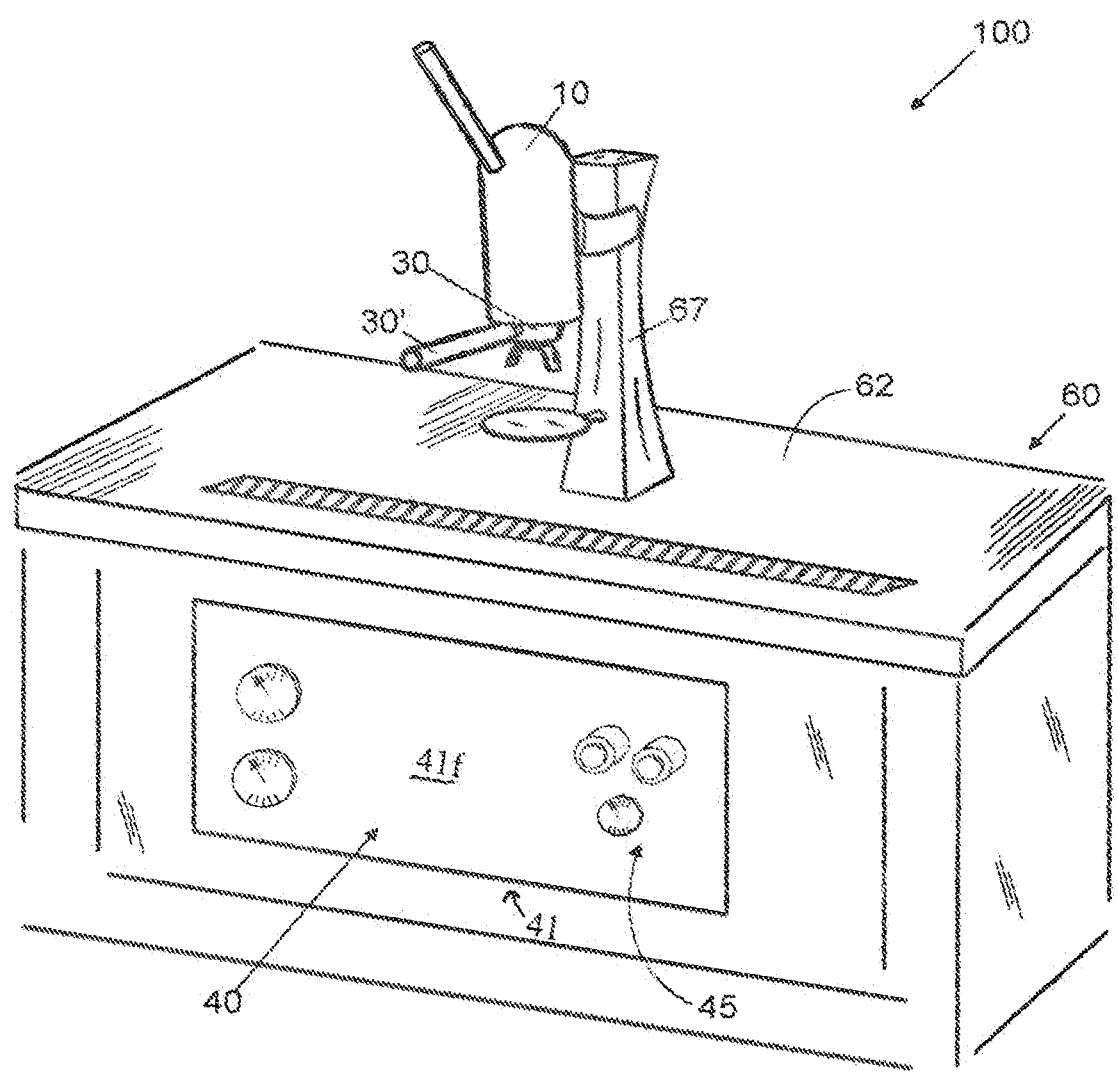
FIG. 2A shows a perspective view of the coffee machine of FIG. 2 in a second arrangement.

As shown in the embodiments of FIGS. 2 and 2A, the supplying unit 40 is removably inserted within the housing chamber 64. In particular, the supplying unit 40 and the housing chamber 64 comprise respective slide guides 75 allowing a drawer-like insertion and extraction thereof.

The slide guides 75 preferably comprise horizontal-sliding bearings and are further provided with stops, preferably spring stops, prearranged to stop the supplying unit 40 when it comes into abutment within the housing chamber 64. On the other hand, to extract the supplying unit 40 it is only necessary to compress the spring to unblock the sliding movement. This solution prevents the drawer, that is the supplying unit 40, from accidentally disengage such that damages due to breakdowns can be avoided. Advantageously, the supplying unit 40 is combined with a safety device, preferably a valve which, in case of accidental disengagement of the supplying unit 40, closes the hydraulic connection 27 and therefore stops the water flow 29 towards the delivering assembly 30.

Therefore, the "drawer-like" coupling allows to selectively switch from a first arrangement (FIG. 2A), wherein the supplying unit 40 is integrated in the housing chamber 64 and operatively connected to the taps 70, and a second arrangement (FIG. 2) wherein the supplying unit 40 is disconnected from the taps 70 and can be completely or partially pulled out from the housing chamber 64 to allow operations of maintenance and/or replacement of the components thereof. The structural solution of the "drawer-like" supplying unit 40, if necessary, allows the supplying unit 40 to be quickly removed and replaced by a similar one, such that the coffee machine 100 will be ready to use without providing prolonged downtime. Therefore, in order to carry on working, it will be necessary to stop during the time required by the replacement.

Again, as shown in FIGS. 2 and 2A, in a preferred embodiment the machine body 10 comprises a supporting column 67 to which the delivering assembly 30 is connected. The supporting column 67 allows to position the delivering assembly 30 at a predetermined height, which can be advantageously adjusted with respect to the working surface 62 such that the demitasses can be prearranged under the delivering assembly 30 itself.

Moreover, in a preferred embodiment showed in FIG. 2, the machine body 10 integrates an auxiliary heating element 80, allowing to maintain or return the water flows 29 coming in the delivering assembly 30 to a proper working temperature, when the coffee machine 100 is not working, i.e. is paused.

In fact, in this way, the auxiliary heating machine allows the water flow 29, already charged and being at the delivering outlet of the delivering assembly 30 itself, to be maintained at an optimum temperature thus preventing the temperature of the water flow 29 itself from lowering if the coffee machine was unused for a prolonged time.

On the other hand, the supplying unit 40 is operatively connected to the delivering assembly 30 through the hydraulic connections 27 and the electric wiring which, in a preferred embodiment, pass through the supporting column 67 and connect with the respective delivering assembly 30. Preferably, the supporting column 67 integrates also a check valve substantially controlling the water flow 29 coming in the delivering assembly 30. In this embodiment providing the supporting column 67, the supporting surface 62 advantageously integrates, under a grid, a tray to collect the liquid and coffee leftovers.

Again, in a preferred embodiment, the supplying unit comprises a control unit 45 visibly prearranged on a front face thereof. The control unit 45 allows to monitor and regulate, for example, the operation of the boiler 20 and of the electropump 26 and of additional components integrated in the supplying unit 40 too, such as control valves of the water flow and thermocouples to detect the working temperature of the water flow etc. Advantageously, the supplying unit 40 can be further provided with at least one water filtering and softening assembly.

Figure 3:
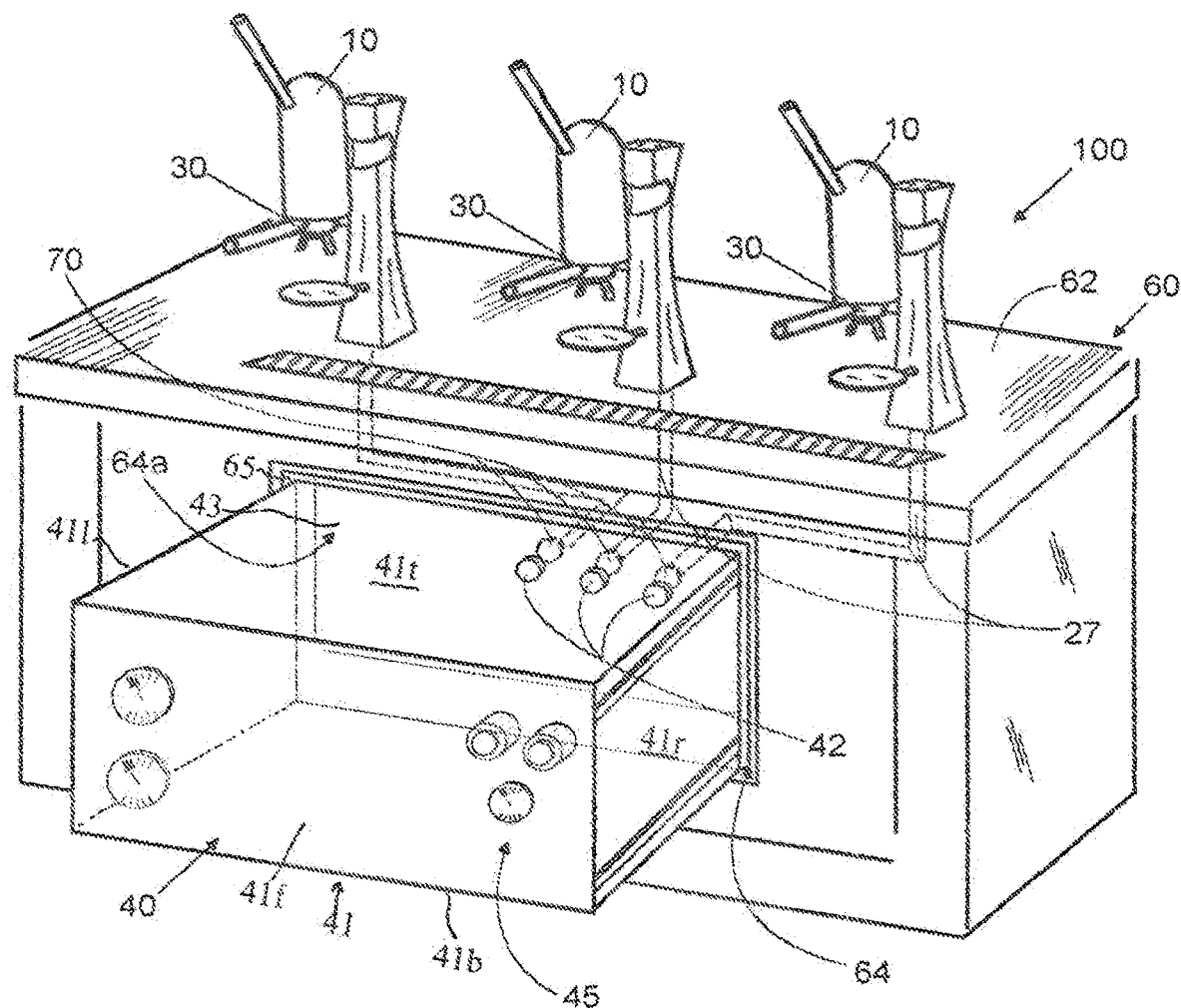
FIG. 3 shows a perspective view of a further embodiment of the coffee machine according to the present invention.
Figure 4:
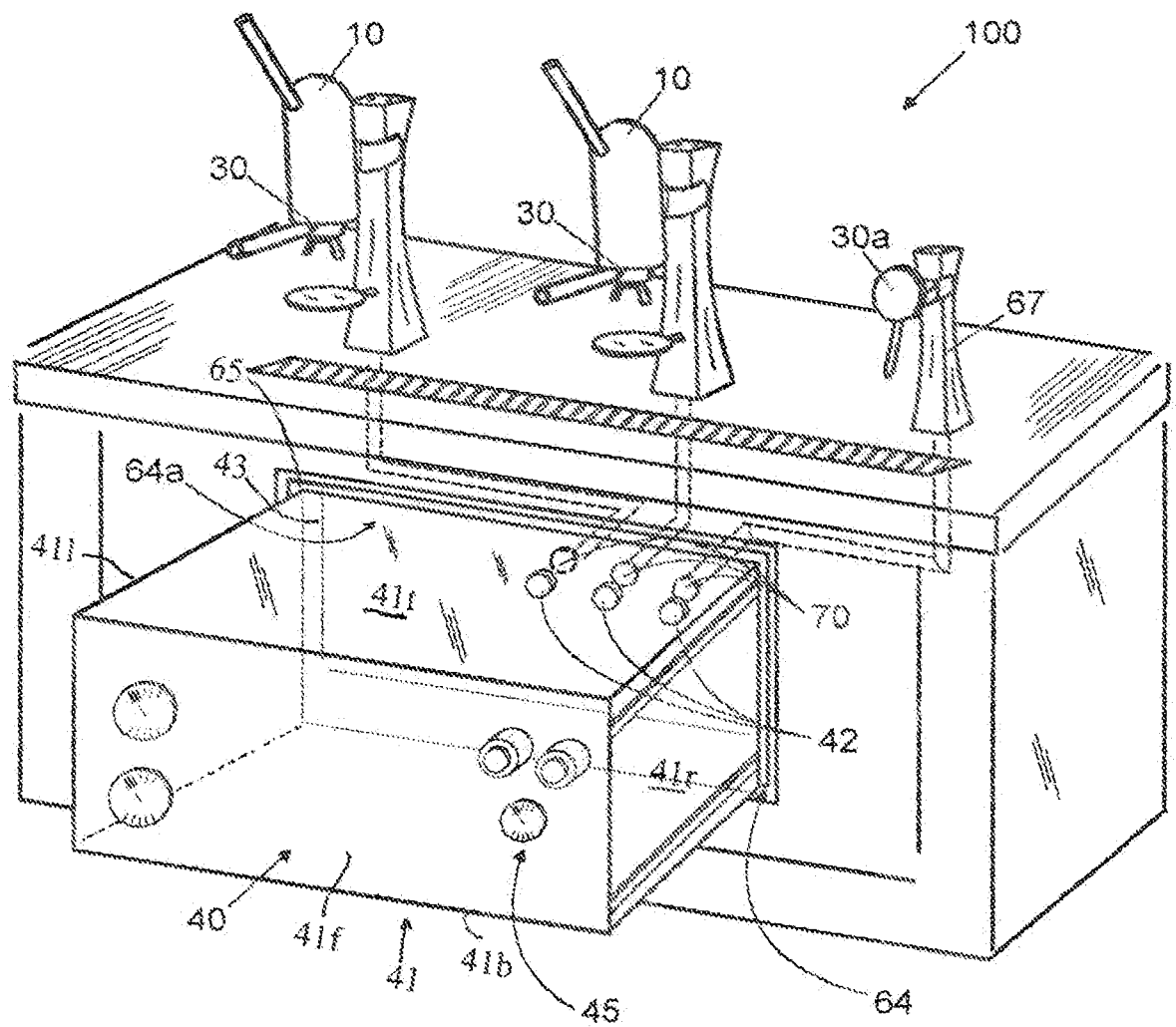
FIG. 4 shows a perspective view of the coffee machine of FIG. 3 complemented with a further operational element.

In preferred embodiment, as shown in FIGS. 3 and 4, the coffee machine 100 comprises a plurality of delivering assemblies 30 each integrated in a respective machine body 10. Each machine body 10 is preferably prearranged and spaced one from another on the working surface 62. In this arrangement, preferably, a single supplying unit 40 is provided which simultaneously serves all the coffee delivering assemblies 30.

Alternatively, in a not shown way, each coffee delivering assembly 30 can be associated to a respective supplying unit 40.

In particular, in the embodiment of FIG. 4, together with the coffee delivering assemblies 30 a steam delivering assembly 30a is also provided, also connected to the supplying unit 40, being in such a case programmed by means of the control unit 45 in order to deliver a high temperature steam flow.

The invention claimed is:

1. A coffee machine, comprising:
   a counter;
   a machine body comprising a delivering assembly for delivering coffee, wherein the machine body is connected to the counter and projects upwardly from the counter so that the delivering assembly is above the counter;
   a housing chamber provided under the counter, the housing chamber comprising a housing chamber cavity defined at least partially by a housing chamber wall, the housing chamber wall being provided with a housing chamber quick-coupling tap;
   a single supplying unit comprising:
      a boiler and a pressurizing device;
      a supplying unit housing configured for drawer-like insertion and extraction relative to the housing chamber cavity and to enclose the boiler and the pressurizing device which are integrated into the single supplying unit, the supplying unit housing comprising at least a supplying unit housing front face and supplying unit housing rear face,
         wherein the front face extends a full height of the supplying unit housing to frontally cover the boiler and the pressurizing device, a control unit being visibly arranged on the front face;
         wherein the single supplying unit rear face comprises a supplying unit tap which is fluidically connected to the boiler,
      wherein the single supplying unit is:
         removably housed under the counter;
         arranged outside of the machine body and remotely therefrom; and
         of an interchangeable type; and
   wherein selective drawer-like insertion and extraction of the supplying unit relative to the housing chamber provides selective coupling of the supplying unit plug and the housing chamber quick-coupling tap for selective fluidic connection of the supplying unit plug with a hydraulic connection supplying the delivering assembly;
   wherein the boiler is configured to heat water to a working temperature,
   wherein the pressurizing device pressurizes water in the boiler and generates a water flow at a set temperature and a set working pressure,
   wherein the water flow is conveyed via the hydraulic connection to the delivering assembly,
   wherein at the delivering assembly the water flow impacts the coffee ground and extracts liquid coffee by brewing.

2. The coffee machine according to claim 1, wherein the hydraulic connection is configured to maintain constant the temperature of the water flow conveyed to the delivering assembly.

3. The coffee machine according to claim 2, wherein the boiler is interchangeable.

4. The coffee machine according to claim 1, wherein a plurality of delivering assemblies are provided, each delivering assembly being integrated in a respective machine body, and wherein the machine bodies are prearranged spaced one from another on said working surface.

5. The coffee machine according to claim 1, wherein the single supplying unit is removably housed in the housing chamber and wherein the single supplying unit is removably inserted in the housing chamber by means of slide guides allowing the drawer-like insertion and extraction.

6. The coffee machine according to claim 4, wherein the boiler supplies pressurized water to the plurality of delivering assemblies.

7. The coffee machine according to claim 1, wherein the machine body comprises a column attached to an upper surface of the counter, the column supporting a corresponding delivering assembly at a height raised with respect to the counter, wherein the supporting column houses the hydraulic connection connected to the delivering assembly.

8. The coffee machine according to claim 2, wherein the hydraulic connection is thermally insulated to reduce thermal losses.

9. The coffee machine according to claim 2, wherein the hydraulic connection comprises heating elements to provide auxiliary heat.

10. The coffee machine according to claim 2, wherein the hydraulic connection comprises a piping positioned coaxial to a hydraulic duct, wherein the piping contains a fluid at a higher temperature than the water temperature.

11. The coffee machine according to claim 1, wherein the boiler supplies pressurized water to a single delivering assembly.

12. The coffee machine according to claim 1, wherein the control unit is configured to monitor and regulate at least the operation of the boiler and the pressurizing device.

13. The coffee machine according to claim 7, wherein the boiler is further connected to a steam delivery assembly placed above the counter.

14. The coffee machine of claim 1, wherein the delivering assembly comprises a delivering outlet having a quick coupling for removably coupling to a portafilter having a handle and a filtering element configured to receive a tablet of loose coffee ground.

15. A coffee machine, comprising:
a counter;
a machine body provided with a delivering assembly for delivering coffee, wherein:
  the machine body is connected to the counter and projects upwardly from the counter so that the delivering assembly is above the counter;
  the machine body comprises a heating element which maintains or returns water flow in the machine body to a working temperature;
  a supplying unit comprising a boiler and a pressurizing device which are integrated into the single supplying unit; the supplying unit comprising a front face which extends to frontally cover the boiler and the pressurizing device, a control unit being visibly arranged on the front face;
wherein the supplying unit is:
  removably housed under the counter;
  arranged outside of the machine body and remotely therefrom; and
  of an interchangeable type; and
a hydraulic connection fluidically connecting the boiler to the delivering assembly of the machine body,
wherein the delivering assembly comprises a delivering outlet having a quick coupling for removably coupling to a portafilter having a handle and a filtering element configured to receive a tablet of loose coffee ground,
wherein the boiler is configured to heat water to the working temperature,
wherein the pressurizing device pressurizes water in the boiler and generates a water flow at a set temperature and a set working pressure,
wherein the water flow is conveyed to the delivering assembly, and
wherein the water flow exits the delivering outlet and impacts the coffee ground and extracts liquid coffee by brewing.

16. The coffee machine according to claim 1, further comprising an auxiliary heating element integrated into the machine body and configured to maintain or return water flow coming into the delivering assembly to the working temperature.

17. The coffee machine according to claim 15, wherein the heating element is integrated into the machine body.

18. A coffee machine, comprising:
a counter;
a machine body comprising a delivering assembly for delivering coffee, wherein the machine body is connected to the counter and projects upwardly from the counter so that the delivering assembly is above the counter;
a housing chamber provided under the counter, the housing chamber comprising a housing chamber cavity defined at least partially by a housing chamber wall, the housing chamber wall being provided with a housing chamber quick-coupling tap;
a supplying unit comprising:
  a boiler and a pressurizing device;
  a supplying unit housing configured for drawer-like insertion and extraction relative to the housing chamber cavity and to enclose the boiler and the pressurizing device which are integrated into the supplying unit, the supplying unit housing comprising:
    a supplying unit tap which is fluidically connected to the boiler provided on a rear face of the supplying unit housing;
    a front face which extends a full height of the supplying unit housing to frontally cover the boiler and the pressurizing device,
a control unit visibly arranged on the front face of the supplying unit housing and configured to monitor and regulate at least the operation of the boiler and the pressurizing device, the control unit being below the counter and below the delivering assembly;
wherein the supplying unit is:
  removably housed under the counter;
  arranged outside of the machine body and remotely therefrom; and
  of an interchangeable type; and
wherein selective drawer-like insertion and extraction of the supplying unit relative to the housing chamber provides selective coupling of the supplying unit plug and the housing chamber quick-coupling tap for selective fluidic connection of the supplying unit plug with a hydraulic connection supplying the delivering assembly;
wherein the water flow is conveyed via the hydraulic connection to the delivering assembly,
wherein at the delivering assembly the water flow impacts the coffee ground and extracts liquid coffee by brewing.

19. The coffee machine according to claim 18, wherein the machine body comprises a column configured to support the delivering assembly and through which a hydraulic connection dedicated to convey the water flow to the delivering assembly extends.

20. The coffee machine according to claim 1, wherein the front face extends to fully cover two dimensions of the supplying unit housing.

\* \* \* \* \*